United States Patent
Gupta et al.

(10) Patent No.: US 6,891,282 B2
(45) Date of Patent: *May 10, 2005

(54) METHOD AND APPARATUS FOR MONITORING TURBINE PARAMETERS OF TURBINE/ALTERNATOR ON COMMON SHAFT

(75) Inventors: Suresh C. Gupta, Los Alamitos, CA (US); Douglas R. Burnham, Stuart, FL (US); J. Michael Teets, Hobe Sound, FL (US); Jon W. Teets, Scottsdale, AZ (US)

(73) Assignee: Elliott Energy Systems, Inc., Stuart, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/678,499

(22) Filed: Oct. 3, 2003

(65) Prior Publication Data

US 2004/0066177 A1 Apr. 8, 2004

(Under 37 CFR 1.47)

Related U.S. Application Data

(62) Division of application No. 10/446,386, filed on May 28, 2003, which is a continuation of application No. 09/840,572, filed on Apr. 23, 2001, now Pat. No. 6,605,928, which is a continuation of application No. 09/319,390, filed on Jun. 1, 1999.
(60) Provisional application No. 60/032,149, filed on Dec. 3, 1996.

(51) Int. Cl.[7] ................................................. H02P 9/04
(52) U.S. Cl. ........................ 290/52; 290/40 B; 322/10
(58) Field of Search ............................ 290/40 A, 40 B, 290/40 C, 52; 322/10, 29

(56) References Cited

U.S. PATENT DOCUMENTS

| | | | |
|---|---|---|---|
| 3,613,360 A | 10/1971 | Howes | 60/39.36 |
| 3,775,663 A | 11/1973 | Turnbull | 321/9 A |
| 4,625,125 A | 11/1986 | Kuwabara | 290/52 |
| 4,841,216 A | 6/1989 | Okada et al. | 322/10 |
| 4,862,009 A | 8/1989 | King | 290/22 |
| 4,992,721 A | 2/1991 | Latos | 322/10 |
| 5,065,086 A | 11/1991 | Takakado | 322/10 |
| 5,119,071 A | 6/1992 | Takezawa et al. | 318/130 |
| 5,387,859 A | 2/1995 | Murugan et al. | 322/10 |
| RE34,962 E | 6/1995 | Shekleton et al. | 322/10 |
| 5,428,275 A | 6/1995 | Carr et al. | 318/146 |
| 5,512,811 A | 4/1996 | Latos et al. | 322/10 |
| 5,559,421 A | 9/1996 | Miyakawa | 322/58 |
| 5,685,156 A | 11/1997 | Willis et al. | 60/723 |
| 5,714,851 A | 2/1998 | Antony et al. | 318/148 |
| 5,801,509 A | 9/1998 | Sawa et al. | 318/705 |
| 5,903,116 A | 5/1999 | Geis et al. | 318/140 |
| 6,281,595 B1 * | 8/2001 | Sinha et al. | 290/40 A |
| 6,323,625 B1 * | 11/2001 | Bhargava | 322/32 |
| 6,605,928 B2 * | 8/2003 | Gupta et al. | 322/10 |

FOREIGN PATENT DOCUMENTS

EP     0 742 634 A2    11/1996

OTHER PUBLICATIONS

Yasuo Fujikawa, "Transportable Micro Gas Turbine Generator", Shinko Electric Journal, No. 143, vol. 41, Sep. 20, 1996.

* cited by examiner

*Primary Examiner*—Nicholas Ponomarenko
(74) *Attorney, Agent, or Firm*—Webb Ziesenheim Logsdon Orkin & Hanson, P.C.

(57) ABSTRACT

An electrical system and apparatus for a turbine/alternator comprising a gas driven turbine and a permanent magnet alternator rotating on a common shaft includes an inverter circuit connectable either to an output circuit or the stator winding of the alternator. A control circuit during a start-up mode switches the inverter circuit to the stator winding of the alternator and during a power out mode switches the inverter circuit to the output circuit. The operating parameters of the turbine are monitored during start-up and/or the power out mode.

37 Claims, 6 Drawing Sheets

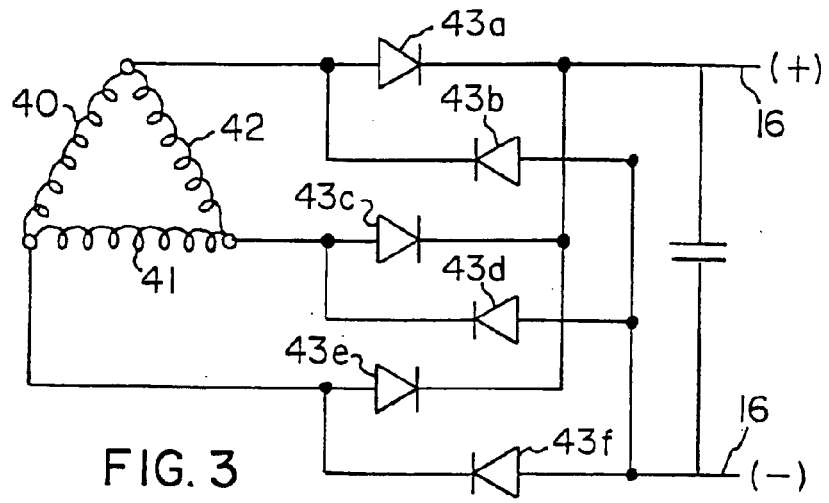
FIG. 3
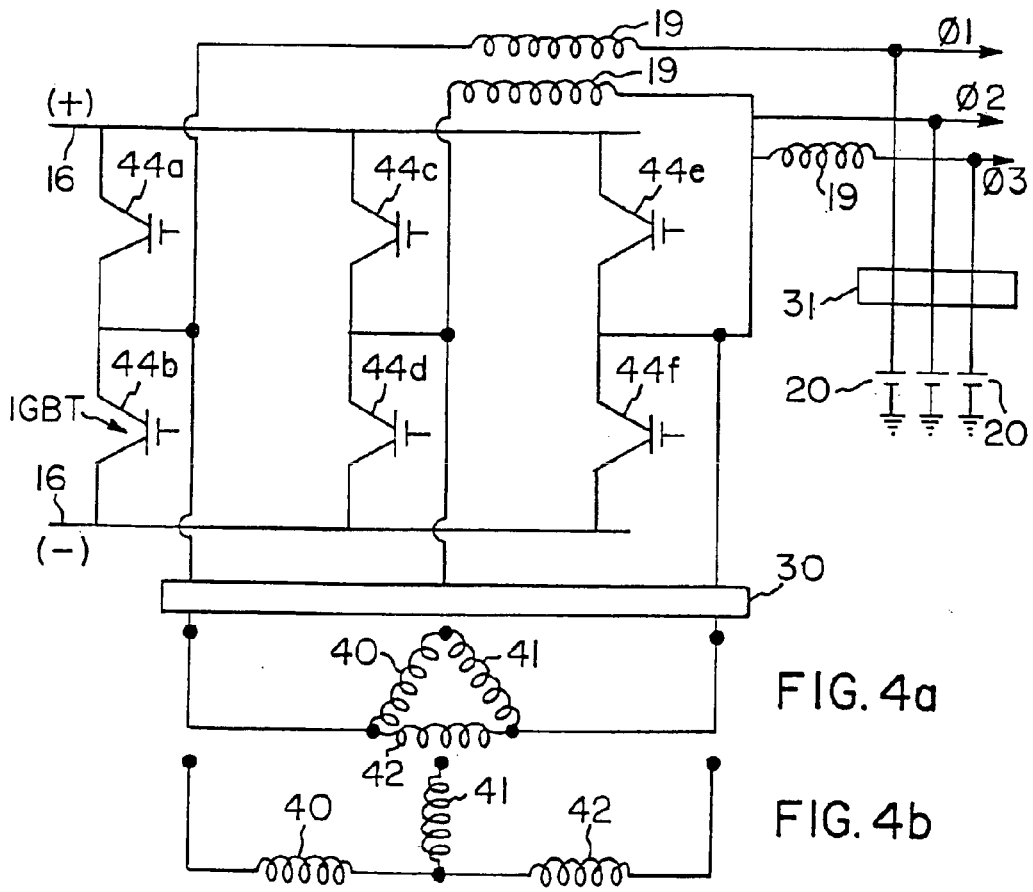
FIG. 4a
FIG. 4b

METHOD AND APPARATUS FOR MONITORING TURBINE PARAMETERS OF TURBINE/ALTERNATOR ON COMMON SHAFT

CROSS REFERENCE TO RELATED APPLICATIONS

This application is a division of U.S. patent application Ser. No. 10/446,386 filed on May. 28, 2003 which is a continuation of U.S. patent application Ser. No. 09/840,572, filed Apr. 23, 2001 now U.S. Pat. No. 6,605,928, which is a continuation of U.S. application Ser. No. 09/319,390, filed Jun. 1, 1999, which is the United States national phase of International Application No. PCT/US97/22405, filed Dec. 3, 1997 which designated, inter alia, the United States, and which claims the benefit of U.S. Provisional Application No. 60/032,149, filed Dec. 3, 1996.

BACKGROUND OF THE INVENTION

Gas turbines must be driven to rotate at a starting speed by auxiliary means prior to fuel injection and ignition and self-sustained operation. In the past, for example, gear box systems driven by auxiliary electric or compressed air motors have been used to rotate the turbine to starting speed. "Air" impingement starting systems have also been used with small turbines and operated by directing a stream of gas, typically air, onto the turbine or compressor wheel to cause rotation of the main rotor. These prior art systems are complex and difficult to implement.

Electrical power may be generated by using a gas turbine to drive an alternator. The alternator may be driven by a free turbine which is coupled to the rotor of the alternator or through a gear box. In these systems, the speed of the turbine must be precisely controlled to maintain the desired frequency and voltage of the alternating current output.

SUMMARY OF THE INVENTION

In accordance with the present invention, an alternator having a permanent magnet rotor is connected to the main turbine rotor making possible both starting of the turbine as well as generation of electrical power. The electrical system described herein allows the rotor to operate at various speeds with an output frequency and voltage unrelated to rotor speed. The electrical system incorporates a unique inverter which yields the appropriate voltage and frequency in both the start-up mode of operation as well as in the power generation mode of operation.

The electrical system is used to cause rotation of the turbine during the start-up mode and subsequently is used to extract electrical power from the alternator after the turbine has reached its normal operating conditions. At start-up, the alternator functions as an electric motor. The functions of the electrical system at start-up comprise power boost, power switching and control to provide, for example, three-phase AC electrical power to the alternator. Both the frequency and voltage are controlled as a function of time and rotation speed. Electrical power for the electrical system is obtained during start-up from either a DC source, such as a battery, or from an AC power line. The start-up circuit may function as an open loop control system or as a closed loop control system based upon rotor position feedback.

As the turbine approaches normal operating conditions at very high speeds of rotation powered through the controlled combustion of fuel and air, the electronic circuitry used to initially drive the alternator as a motor is automatically reconfigured to accept power from the alternator. Subsequently, three-phase electrical power becomes available for extraction from the electrical system at desired voltages and frequencies.

Briefly, according to this invention, an electrical system for a turbine/alternator comprises a gas driven turbine and alternator rotating on a common shaft. The alternator has a permanent magnet rotor and a stator winding. A stator circuit is connected to the stator winding. A DC bus powers an inverter circuit. The output of the inverter circuit is connected to an AC output circuit or through a first contactor to the stator circuit. A rectifier is connected between the stator circuit and the DC bus. A signal generator is driven by signals derived from the rotation of the common shaft and an open loop waveform generator produces waveforms independent of the rotation of the common shaft. A second contactor connects either the signal generator or the open loop waveform generator to a driver connected to cause switching of the inverter circuit. A temporary power supply supplies energy to the DC bus. A control circuit, during a start-up mode, switches the first contactor to connect the inverter circuit to the stator circuit and switches the second contactor to connect the signal generator to the driver, preferably a pulse width modulator. The control circuit, during a power out mode, switches the first contactor to disconnect the inverter from the stator circuit and switches the second contactor to connect the open loop waveform generator to the driver. During the start-up mode, the alternator functions as a motor to raise the speed of the turbine to a safe ignition speed. The inverter is used to commutate the stator windings in response to the signal from the signal generator. During a power out mode, the inverter is used to convert the rectified output of the alternator into AC signals applied to the AC output circuit in response to the open loop waveform generator, thus producing electric power having a frequency unconnected to the rotational speed of the alternator.

According to a preferred embodiment, an electrical system for a turbine/alternator comprises a gas driven turbine and alternator rotating on a common shaft. The alternator is comprised of a permanent magnet rotor and a stator winding. The stator winding is connected through a contactor to an inverter circuit. The inverter circuit is connected to a DC bus. The inverter circuit is also connected to a signal generator. A position encoder is connected to the drive shaft of the turbine/alternator. Its output is also connected to the signal generator. The inverter processes the DC bus voltage and signal generator output to develop three-phase AC output voltages. The signal generator controls the inverter output frequency. Concurrently, a variable voltage DC power supply applies a time variant voltage to the DC bus. The DC bus voltage controls the inverter output voltage level. Thus, the output frequencies and voltages of the inverter are fully controllable. During the start-up mode, the output of the inverter is applied through a contactor to the alternator which functions as an electric motor. When the start-up mode is initiated, the DC power supply voltage begins to ramp up from 0 volts. The signal generator output frequency is set to a fixed low frequency. As the DC bus voltage begins to increase, the alternator rotor begins to rotate at a low speed. The encoder senses shaft position changes and sends this information to the signal generator. The signal generator processes this information and begins to ramp up its output frequency as a function of engine speed. This increasing frequency is directed to the inverter where it is used to control the frequency of the inverter output voltage. This controlled process results in a time variant inverter output whose frequency and voltage are applied through a contactor to the alternator. As a result, the alternator functions as a motor and accelerates the speed of the turbine shaft to a value suitable for ignition. Once the turbine has reached its normal operating speed, the variable voltage power supply is deactivated. Further, the shaft position encoder signal is disconnected from the signal generator and is replaced by a precision, fixed time base signal. Subsequently, the alternator AC output voltage is rectified and the resulting DC output voltages are applied to the DC bus. This reconfiguration permits the inverter to operate as a fixed frequency power output source independent of turbine rotor speed. In the power output mode, the inverter provides power through output filters. The filtered output power is then connected to a contactor which directs it to a set of terminals where it is available for consumer use. A control system integrates operation of the inverter, power supply, signal generator and contactors during both the start-up and power output modes of operation. During the power output mode of operation, the control system continuously measures output voltages from the inverter and sends signals to the signal generator to compensate for output voltage fluctuations caused by varying output load conditions.

According to a preferred embodiment, the signal generator is a pulse width modulator. Typically, the stator winding of the alternator is a three-phase winding and the inverter circuit and the AC circuits are three-phase circuits.

According to a preferred embodiment, the electrical system comprises a battery powered supply circuit including a battery and a boost from 0 inverter circuit for outputting to the DC bus a voltage between 0 and that required by the inverter to power the alternator to safe ignition speeds. According to another preferred circuit, the battery powered supply circuit comprises a step-down circuit for recharging the battery and for powering low voltage devices such as fans and pumps from the DC bus during the output mode.

BRIEF DESCRIPTION OF THE DRAWINGS

Further features and other objects and advantages will become clear from the following detailed description made with reference to the drawings in which:

FIG. 3 schematically illustrates a rectifier circuit for converting the alternator output to a DC current voltage on the DC bus;

FIGS. 4a and 4b schematically illustrate the inverter circuit comprised of six IGBT switches used to commutate the current to the alternator during the start-up mode and to provide three-phase output during the power out mode;

DESCRIPTION OF THE PREFERRED EMBODIMENTS

Figure 1:
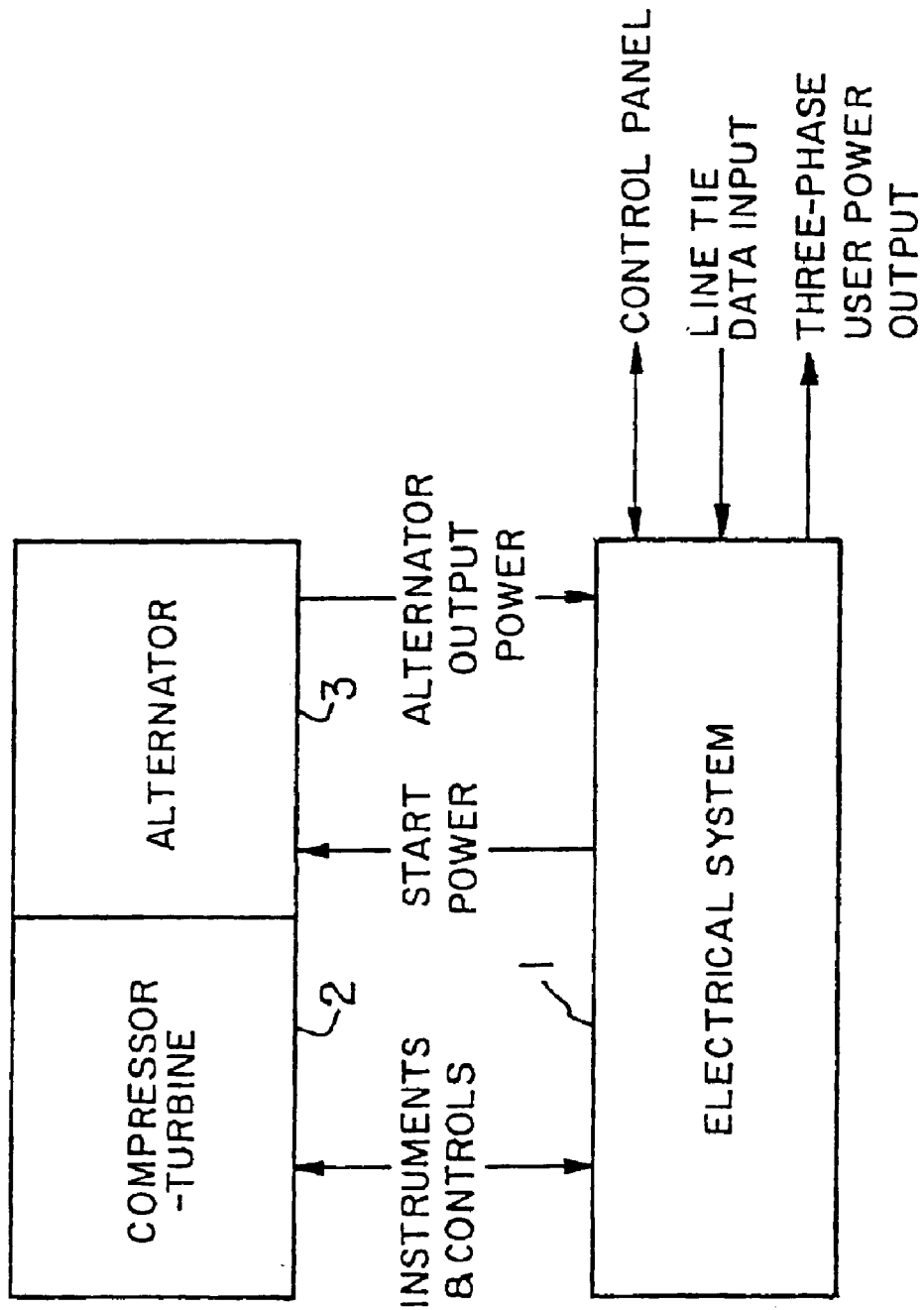
FIG. 1 is a schematic drawing showing the overall relationship of the electrical system to the gas turbine/alternator.

FIG. 1 illustrates the relation between the electrical control system 1, according to this invention, and the power generation system comprising a gas turbine 2 and an alternator 3. The alternator armature is mounted on a shaft common with the turbine shaft. The electrical control system interacts with the power generation system to provide start-up power, engine control, signal processing, battery charging, user interfaces, as well as power conversion and control for generating user power. Both stand-alone and line tie operations are facilitated.

Figure 2:
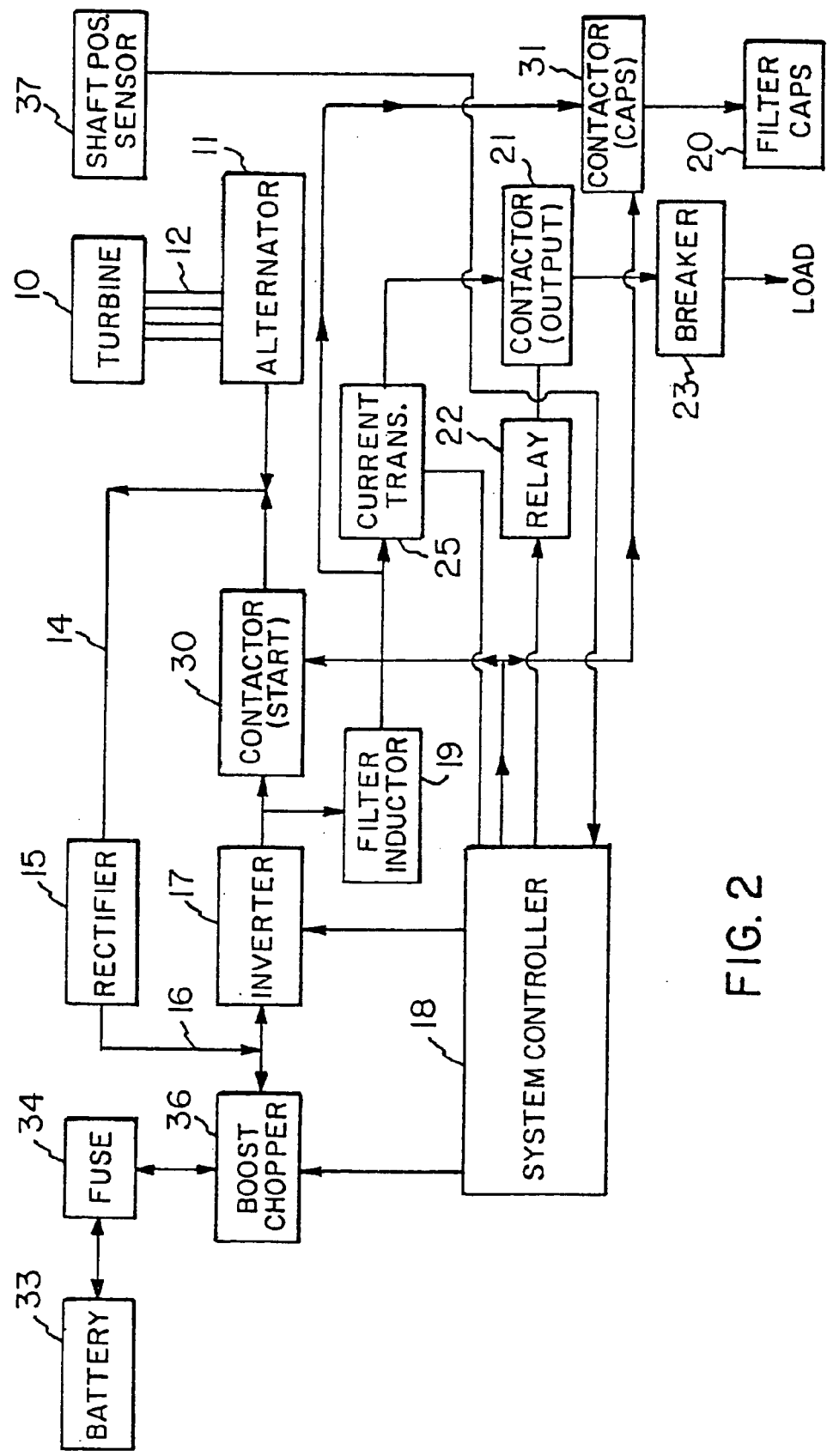
FIG. 2 is a schematic drawing showing the electrical system for providing electrical power to the alternator during the start-up mode and for passing power generated to the load during the power out mode.

Referring now to FIG. 2, the general arrangement of the electrical power circuits for a turbine generator, according to this invention, is depicted. A turbine 10 is connected to a permanent magnet (rare earth samarium-cobalt) alternator 11 by a common shaft 12. The stator is manufactured using a stack of high quality, low loss, electric sheet steel laminations. This stack contains a three-phase distributed winding in twelve stator slots with a housing with provision for oil cooling. The performance of the alternator depends upon effective cooling. In the currently implemented embodiment, the four pole permanent magnet rotor has the following dimensions: active length 3.55 inches; diameter under magnets 1.00 inch; diameter over 1.430 inches; weight of magnets 0.70 pounds; rotor weight 1.95 pounds.

The three-phase stator windings of the alternator are connected by an AC bus 14 to a rectifier 15. The output of the rectifier is connected to a DC bus 16. During power generation, that is, the power out mode when the turbine is driving the alternator, the three-phase output on the AC bus is rectified by the rectifier providing DC power on the DC bus. The DC power is applied to an inverter 17. The inverter 17 during the power out mode switches the DC power to provide three-phase output having a frequency unrelated to the rotational speed of the alternator. The frequency is controlled by signals from a system controller 18. The inverter output is filtered by inductors 19 and capacitors 20. The filtered three-phase output is passed to a load through an output contactor 21 (controlled by the system controller 18 through a relay 22) and output breakers 23.

A current transformer 25 senses output current which is fed back to the system controller 18 enabling current limit and power balancing of the three-phase output.

In order to start the turbine, it is necessary to accelerate it to a suitable ignition speed. During the start-up mode, the alternator is operated as a motor. During the start-up mode, the output of the inverter 17 is connected to the stator windings of the alternator 11 through a start contactor 30 which is controlled by the system controller 18. At the same time, a capacitor contactor 31 removes the filter capacitors 20 from the output circuit. Because of the very high frequencies during start-up, it is necessary to remove the filter capacitors 20 from the stator circuits.

During start-up, DC power is drawn from a battery 33 through a fuse 34 and is applied to a boost chopper 36. The boost chopper ramps the voltage of the DC battery power from 0 to a voltage which, when converted to AC by the inverter 17, will drive the alternator as a motor at a speed that will enable safe ignition of the turbine. Preferably, a shaft position sensor 37 generates a signal which is applied to the system controller 18 which in turn uses the signal to control the inverter 17 to generate a three-phase output which commutates the stator windings of the alternator to ramp the alternator and turbine up to ignition speed.

Referring to FIG. 3, a suitable rectifier circuit is schematically illustrated. The three-phase stator windings 40, 41, 42, delta connected, are connected as illustrated by six diodes 43a, 43b, 43c, 43d, 43e, 43f to the DC bus 16.

Referring to FIGS. 4a and 4b, a suitable inverter circuit is schematically illustrated. (FIG. 4a illustrates a delta connection and FIG. 4b a star connection for the stator winding.) The inverter comprises six solid state (IGBI) switches which, during the start-up mode, can alternately connect one corner of the delta connected stator windings to the plus or minus side of the DC bus 16 through contactor 30. Also, the solid state switches 44a, 44b, 44c, 44d, 44e, 44f connect either the plus or minus side of the DC bus to the filter inductors 19 at all times and after start-up to the filter capacitors 20 through contactor 31. The inverter is used to generate three-phase output signals. It is capable of providing a wide variety of output voltages and frequencies as controlled by a microprocessor in the system controller. The output inverter is used in two distinctly different ways during start-up and power out operations of the power generation system.

During the start-up phase, the inverter is used to output time variant voltages and frequencies needed to drive the alternator as a motor and to accelerate the alternator turbine drive shaft to rotation speeds necessary for sustained operation of the power generation system. In its present configuration, this requires three-phase voltages ranging from 0 up to 350 volts at frequencies from near 0 and up to 2 kHz.

During the power out phase, the inverter is used to output three-phase voltages consistent with user power requirements. Typical voltages are 480 vac, 240 vac, 208 vac, 120 vac at frequencies of 50, 60 and 400 Hz. This system is not limited to these values and a nearly infinite range of voltages and frequencies could be selected if desired.

Certain applications of the power generation system require the output inverter to be capable of line tie to an existing power grid. Line phasing circuitry is used in conjunction with a system controller to monitor the phase of the power grid voltage and synchronize the power generation system to it. In like manner, the system controller can monitor power grid voltage amplitudes and adjust the power generation system output to facilitate and control the transfer of power to the grid.

Figure 5:
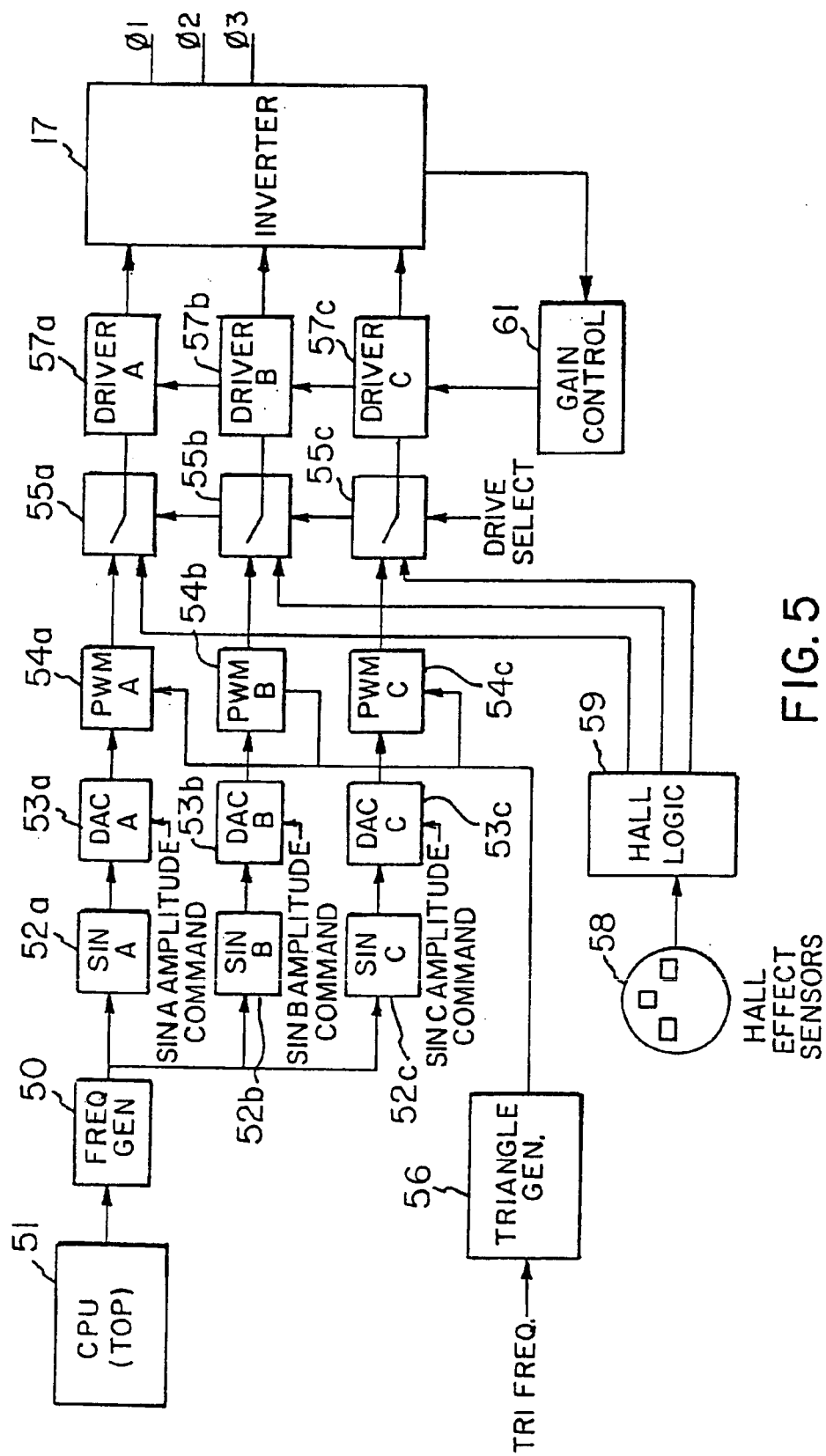
FIG. 5 schematically illustrates the open loop waveform generator and closed loop driver for the inverter circuit.

FIG. 5 schematically illustrates the portion of the system controller for generating an open loop waveform for driving the inverter 17. A frequency generator 50 generates output pulses at frequencies selectable between 250 Hz and 600 kHz by a CPU 51. These pulses are applied to advance the output in sine wave PROMs (programmable read only memories) 52a, 52b, 52c. The outputs from the sine wave PROMs (basically a 256K lookup table) are phase shifted from each other exactly 120° apart. The outputs from the PROMs are applied to digital-to-analog converters 53a, 53b, 53c, producing three analog sine waves. The amplitude of each waveform out of the digital-to-analog converters is individually controlled by a sine wave (amplitude) command. The sine waves are then compared in pulse width modulators 54a, 54b, 54c with a triangle wave from a triangle wave generator. The frequency of the triangle wave generator is controllable. The pulse width modulated waveforms are then applied through drive select gates 55a, 55b, 55c to drivers 57a, 57b, 57c. In the currently implemented embodiment, the drivers produce three complimentary pairs of pulse signals for controlling the inverter. The waveform generator is used to drive the inverter during the power out mode when the turbine is driving the alternator. The waveform circuit, so far as described, is open loop. In other words, it is not controlled by alternator rotation speed. However, various feedback signals can be used to adjust the amplitude of signals out of the digital-to-analog converter. While the waveform circuit is principally used to drive the inverter during the power out mode, it may be used to control the inverter at the very beginning of the start-up mode to cause the armature to rotate at least once. This permits phasing of the Hall effect sensor signals.

Three Hall effect switches 58 are mounted to pick up magnetic pulses 120° apart as the common shaft rotates. These signals are processed by a Hall logic circuit 59 to produce a pair of signals corresponding to each pickup pulse. The three pairs of signals are gated by the drive select gates 55a, 55b, 55c to the drivers 57a, 57b, 57c. The position sensor system consists of permanent magnets and Hall effect sensors which are used during turbine engine start-up to commutate electrical power to the stator windings of the alternator. Phasing of the sensors is accomplished at the beginning of the start-up phase by briefly rotating the turbine alternator shaft in the direction of normal rotation. Rotation of the shaft during this initial period of the start-up phase is accomplished by the microcomputer control of the output inverter system in an open loop configuration that does not utilize the Hall effect sensors. Once phasing of the sensors has been completed, their signals are directed to the output inverter section of the system to facilitate start-up of the turbine engine under closed loop control. The Hall effect pickups enable a closed loop commutation of the inverter 17 and the stator windings of the alternator. A gain control circuit 61 processes feedback from the inverter circuit 17 to adjust the gain of the driver circuits to balance the output of the three phases output from the inverter 17.

Figure 6:
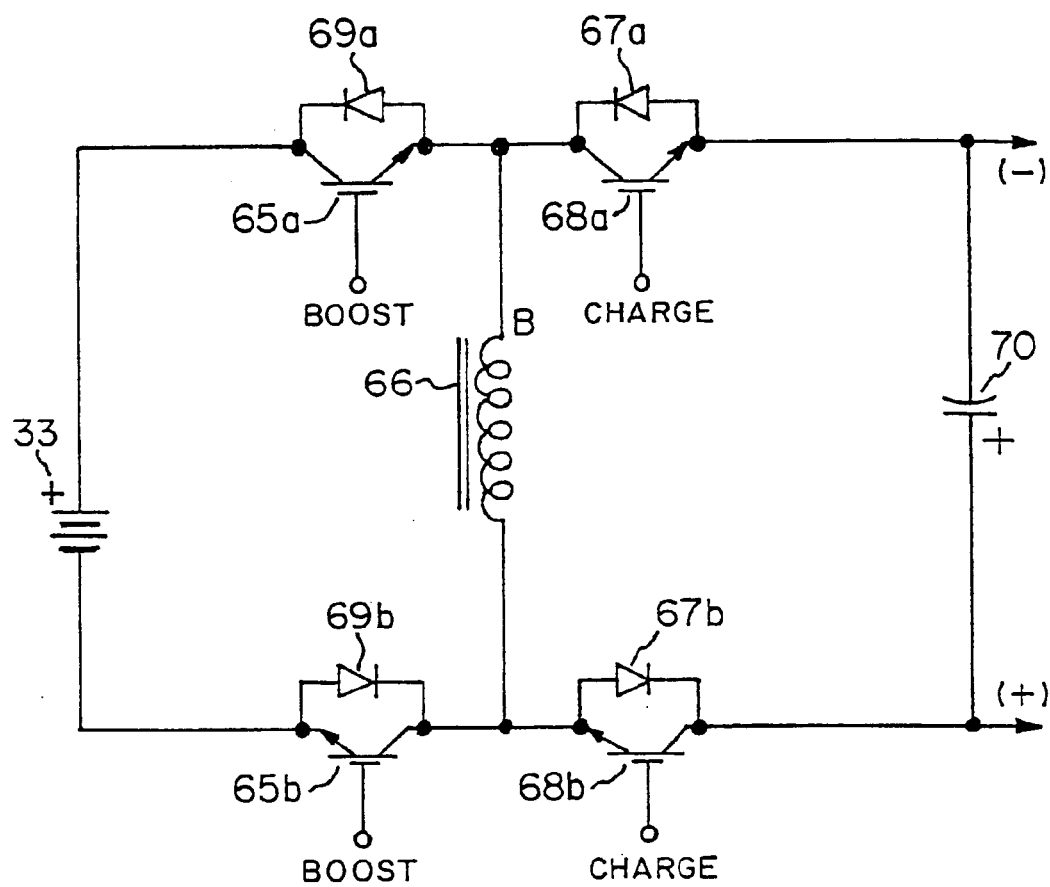
FIG. 6 illustrates a boost/buck chopper suitable for using battery power during the start-up mode to power the DC bus and for charging the battery from the DC bus during the power out mode.

During the start-up mode, the battery supplies power to the DC bus through the boost chopper. FIG. 6 is a schematic of a boost chopper for supplying the DC bus with a voltage of 0 to 350 volts from a 12 or 24 volt battery during the start-up mode. When the boost chopper switches 65a and 65b are closed (conducting), current flows in an inductor 66. When the switches 65a and 65b are open, the magnetic field in the inductor collapses driving end A of the inducter very positive with respect to end B and supplying current through diodes 67a and 67b to the positive and negative sides of the DC bus, respectively. The switches 65a and 65b are driven at 4 kHz. The duty cycle is controlled from 0 to 100% enabling the output voltage across DC bus capacitors 70 to vary from 0 to 350 volts. The use of a boost from 0 chopper circuit enables a gradual increase in the rotational speed of the alternator during start-up.

During the power out mode, the battery is charged by a charger circuit. Charger switches 68a and 68b are switched at about 1 kHz. The duty cycle is adjustable. When the charger switches 68a and 68b are closed, current from the DC bus flows through inductor 66. When the charger switches are opened, side B of the inductor goes positive with respect to side A and charges the battery drawing current through diodes 69a and 69b. It is not necessary, as illustrated here, that the boost and charger circuits share the same inductor.

In the preferred embodiment of this invention designed for a 45 kW power output, the following components are sized as set forth:

| | |
|---|---|
| filter inductors 19 | 300 mH per phase |
| filter capacitors 20 | 100 µF per phase |
| DC bus capacitor 70 | 4700 µF |
| IGBT switches in inverter 17 | 400 A/600 V |

Figure 7:
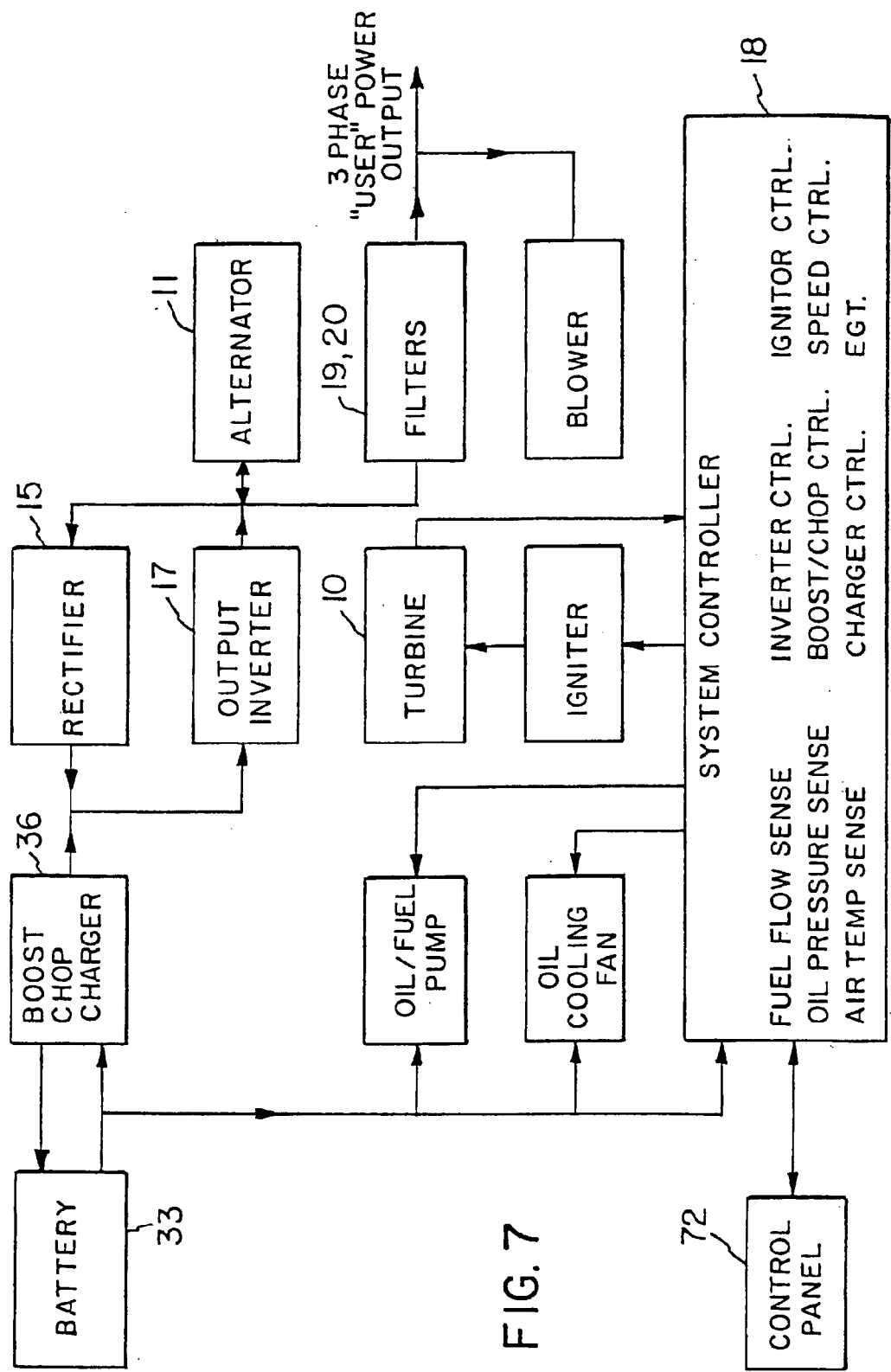
FIG. 7 schematically illustrates the entire electrical system including turbine sensors and turbine controls.

FIG. 7 illustrates the interaction between the system controller and the gas turbine. The system controller utilizes three microprocessors that communicate with each other through a high speed serial link and provide the following functions: (1) control of the electrical power required to rotate the turbine rotor up to speeds necessary to sustain operation of the turbine; (2) process and control of the electrical power generated by the alternator during power out system operation to provide three-phase output power at common line voltages and frequencies; (3) control of other subsystems needed to operate the power generation system, such as the ignitor, cooling fans, fuel and oil pump; (4) signal conditioning and control of instrumentation for measurement of pressures, temperatures, flow and speed; and (5) generation and control of a control panel providing a user interface for system operation and diagnostics.

The three microprocessors each have their own associated memory programmed to run independently. One microprocessor is directed to monitoring the keypad, display and RS232 communicators. A second microprocessor is devoted to monitoring the turbine parameters, to actuate fault trips and to log a history of operation parameters for the latest hour of operation. The third microprocessor monitors and directs the electrical circuit selected frequencies, voltages, actuates relays, etc.

OPERATION

There are two separate modes of system operation. In the first mode, the system controller 18 is used to control the boost chopper 36 and output inverters 17 to vary the output voltage and frequency as a function of time. Operating in this manner, the alternator is utilized as a variable speed motor to rotate the engine at speeds required for the gas turbine sustained operation. In the second mode of operation, the inverter section is automatically reconfigured by the system controller 18 for providing user power output. In this mode of operation, high frequency AC power output from the alternator is converted to DC power by the rectifier 15 and applied to the input of the inverter. The inverter, in conjunction with the system controller, provides the desired three-phase output voltages and frequencies required in normal user applications. The output voltage frequency and phase are controlled in a manner consistent with stand-alone and line tie user applications.

The control panel 72 provides the interface between the user and the controller. It provides the user with various control and instrumentation options, such as start-up, shut down, line tie and diagnostics. During normal start-up and operation of the system, the system controller sequences and controls the power generation system as follows.

1) On command from the control panel 72, the controller 18 sends appropriate commands to the waveform generators and boost chopper to initiate brief rotation of the turbines so that the Hall position sensors are properly phased for subsequent start-up functions.

2) Next, the controller controls the boost chopper 36 and the waveform generator (see items 50 to 54 and 58 in FIG. 5) to ramp up three-phase voltages and frequencies to the inverter. The three-phase outputs are directed to the alternator which responds by accelerating the rotation of the turbine shaft to speeds necessary for its sustained operation.

3) During the above start-up sequence, the system controller monitors and controls other functions, such as fuel flow, ignition, rotation speeds, temperatures and pressures.

4) Following the start-up phase, the system controller reconfigures the boost chopper to operate as a battery charger. In addition, the waveform generator is reset to provide signals needed for generation of user power output requirements. These signals are connected to the input of the selector switch where they are directed to the drivers and inverter. As a result, the inverter provides the desired three-phase output voltages and frequencies desired by the user.

5) During normal power out operation as described in 4) above, the system controller monitors and controls all functions necessary for control of the power generation system including, but not limited to, control and/or monitoring of fuel flow, temperature, pressure, speed, run time and various diagnostics unique to the components of the complete power generation system.

Having thus described our invention with the detail and particularity required by the Patent Laws, what is desired protected by Letters Patent is set forth in the following claims.

What is claimed:

1. A method of controlling a turbine/alternator comprising a gas driven turbine and permanent magnet alternator on a common shaft comprising:
   providing electric power to said turbine/alternator through an inverter circuit that outputs electrical power to said turbine/alternator at frequencies and voltages required to start said turbine/alternator to achieve self-sustained operation of said turbine/alternator;
   reconfiguring said inverter circuit by switches internal to the inverter circuit to output electric power from said turbine/alternator at desired frequencies unrelated to turbine/alternator rotation speed when self-sustained operation of said turbine/alternator is achieved; and
   monitoring turbine operation parameters prior to self-sustained operation to activate the reconfiguring step and to monitor and control turbine operation before and after the reconfiguring step.

2. The method of claim 1, further comprising logging a history of the turbine operation parameters.

3. The method of claim 1, wherein monitoring turbine operation parameters is performed by a controller comprising a microprocessor.

4. The method of claim 1, further comprising monitoring interfacing sensors.

5. The method of claim 3, wherein said controller comprises a plurality of microprocessors each having its own associated memory programmed to run independently.

6. The method of claim 5, wherein the microprocessor comprising said plurality of microprocessors communicates with each other through a high speed serial link.

7. The method of claim 1, further comprising monitoring a control panel for providing a user interface for system operation and diagnostics.

8. The method of claim 1, further comprising providing a user interface configured to provide a user with line tie options, start-up options or shut-down options.

9. The method of claim 1, further comprising monitoring and/or controlling fuel flow of said gas driven turbine.

10. The method of claim 1, further comprising monitoring and/or controlling ignition of said gas driven turbine.

11. The method of claim 1, further comprising monitoring and/or controlling rotation speeds of said turbine/alternator.

12. The method of claim 1, further comprising monitoring and/or controlling temperature of said turbine/alternator.

13. The method of claim 1, further comprising monitoring and/or controlling pressures of said turbine/alternator.

14. The method of claim 1, further comprising monitoring and/or controlling run time of said turbine/alternator.

15. The method of claim 1, further comprising monitoring and/or controlling diagnostics of said turbine/alternator.

16. The method of claim 1, wherein during providing electric power to said turbine/alternator, controlled combustion of fuel and air is provided to said gas driven turbine of the turbine/alternator.

17. The method of claim 1, wherein when reconfiguring said inverter circuit, said inverter circuit is connected to said turbine/alternator through a rectifier.

18. The method of claim 1, wherein said inverter circuit comprises an output filter for filtering said electric power, which output filter is removed when providing electric power to said turbine/alternator through said inverter circuit.

19. An electric system for a turbine/alternator comprising a gas driven turbine and permanent magnet alternator on a common shaft comprising:
- an inverter provided for operation of said turbine/alternator;
- means to provide electric power to said turbine/alternator through said inverter to start said turbine/alternator to achieve self-sustained operation of said turbine/alternator;
- means to reconfigure said inverter to output electric power from said permanent magnet turbine/alternator to supply the electric power to a load; and
- a controller for monitoring turbine operation parameters prior to self-sustained operation to activate the reconfiguring step and to monitor and control turbine operation before and after the reconfiguring step.

20. The electric system of claim 19, wherein said controller is adapted to log a history of turbine operation parameters.

21. The electric system of claim 20, wherein said controller comprises a microprocessor devoted to monitoring turbine operation parameters.

22. The electric system of claim 20, wherein said controller comprises a microprocessor directed to monitoring interfacing sensors.

23. The electric system of claim 20, wherein said controller comprises a plurality of microprocessors each having its own associated memory programmed to run independently.

24. The electric system of claim 23, wherein the microprocessor comprising said plurality of microprocessors communicates with each other through a high speed serial link.

25. The electric system of claim 19, wherein said controller comprises a microprocessor for monitoring a control panel for providing a user interface for system operation and diagnostics.

26. The electric system of claim 19, further comprising a user interface configured to provide a user with line tie options, start-up options or shut-down options.

27. The electric system of claim 19, wherein said controller is adapted for control and/or monitoring of fuel flow of said gas driven turbine.

28. The electric system of claim 19, wherein said controller is adapted for controlling and/or monitoring of the ignition of said gas driven turbine.

29. The electric system of claim 19, wherein said controller is adapted for controlling and/or monitoring of rotation speeds of said turbine/alternator.

30. The electric system of claim 19, wherein said controller is adapted for controlling and/or monitoring of temperatures of said turbine/alternator.

31. The electric system of claim 19, wherein said controller is adapted for controlling and/or monitoring of pressures of said turbine/alternator.

32. The electric system of claim 19, wherein said controller is adapted for controlling and/or monitoring of run time of said turbine/alternator.

33. The electric system of claim 19, wherein said controller is adapted for controlling and/or monitoring of diagnostics of said turbine/alternator.

34. The electric system of claim 19, further comprising means to provide controlled combustion of fuel and air to said gas driven turbine to achieve self-sustained operation of said turbine/alternator.

35. The electric system of claim 19, wherein said means to reconfigure said inverter connects said inverter to said turbine/alternator through a rectifier.

36. The electric system of claim 19, wherein said load comprises a power line, and said means to reconfigure said inverter supplies electric power to said power line at a common line voltage and frequency.

37. The electric system of claim 19, wherein said inverter circuit comprises an output filter for filtering said electric power, which output filter is removed when providing electric power to said turbine/alternator through said inverter circuit.

* * * * *